(12) United States Patent
Linville et al.

(10) Patent No.: US 10,866,563 B2
(45) Date of Patent: Dec. 15, 2020

(54) SETTING HOLOGRAM TRAJECTORY VIA USER INPUT

(71) Applicant: Microsoft Technology Licensing, LLC, Redmond, WA (US)

(72) Inventors: Addison Kenan Linville, Kenmore, WA (US); Jarod Wayne Lenz Erwin, Snoqualmie, WA (US); Dong Yoon Park, Woodinville, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 16/274,602

(22) Filed: Feb. 13, 2019

(65) Prior Publication Data

US 2020/0257245 A1    Aug. 13, 2020

(51) Int. Cl.
*G03H 1/22* (2006.01)
*G03H 1/00* (2006.01)
*G06F 3/01* (2006.01)
*G06T 19/00* (2011.01)
*G06T 7/593* (2017.01)

(52) U.S. Cl.
CPC ......... *G03H 1/2249* (2013.01); *G03H 1/0005* (2013.01); *G06F 3/013* (2013.01); *G06F 3/017* (2013.01); *G06T 7/593* (2017.01); *G06T 19/006* (2013.01); *G03H 2001/0061* (2013.01);
(Continued)

(58) Field of Classification Search
CPC ............... G03H 1/2249; G03H 1/0005; G03H 2001/0061; G03H 2001/2252; G06F 3/017; G06F 3/013; G06T 7/593; G06T 19/006; G06T 2207/30241
See application file for complete search history.

(56) References Cited

U.S. PATENT DOCUMENTS 9,928,661 B1 *  3/2018  Kinstner ................. A63F 13/00
9,984,510 B1 *  5/2018  Kinstner ............... G06T 19/006
(Continued)

OTHER PUBLICATIONS

Bonasio, Alice, "This Tech Lets You Move Virtual Objects Like a Jedi", Retrieved from: https://vrscout.com/news/move-virtual-objects-like-a-jedi/, Dec. 6, 2018, 8 Pages.
(Continued)

*Primary Examiner* — Chante E Harrison
(74) *Attorney, Agent, or Firm* — Alleman Hall Creasman & Tuttle LLP (57) ABSTRACT

One disclosed example provides a computing device comprising a logic subsystem comprising a processor, and memory storing instructions executable by the logic subsystem. The instructions are executable to display via a display system one or more holographic objects, receive depth image data from a depth image sensor, detect a user input setting a trajectory for a selected holographic object, in response to detecting the user input setting the trajectory for the selected holographic object, determine the trajectory for the selected holographic object set by the user input, determine, based upon the depth image data and the trajectory, a surface intersected by the trajectory of the selected holographic object, and display via the display system the selected holographic object as travelling along the trajectory and changing in form upon encountering the surface.

20 Claims, 7 Drawing Sheets

(52) U.S. Cl.
CPC ........... *G03H 2001/2252* (2013.01); *G06T 2207/30241* (2013.01)

(56) References Cited

U.S. PATENT DOCUMENTS

| | | |
|---|---|---|
| 10,139,899 B1* | 11/2018 | Niemeyer ............. A63F 13/573 |
| 2013/0002548 A1* | 1/2013 | Ueno ....................... G09G 5/08 |
| | | 345/158 |
| 2013/0286004 A1* | 10/2013 | McCulloch ........... G06T 19/006 |
| | | 345/419 |
| 2013/0335405 A1 | 12/2013 | Scavezze |
| 2017/0031502 A1* | 2/2017 | Rosenberg ............. G06F 3/017 |
| 2018/0173323 A1 | 6/2018 | Harvey et al. |
| 2018/0286126 A1 | 10/2018 | Schwarz et al. |
| 2019/0212827 A1* | 7/2019 | Kin .................... G02B 27/0179 |
| 2019/0271846 A1* | 9/2019 | Fujimaki .............. G02B 27/017 |
| 2019/0362562 A1* | 11/2019 | Benson ............. G06K 9/00671 |

OTHER PUBLICATIONS

"International Search Report and Written Opinion Issued in PCT Application No. PCT/US2020/015503", dated May 13, 2020, 11 Pages.

\* cited by examiner

SETTING HOLOGRAM TRAJECTORY VIA USER INPUT

BACKGROUND

Some display systems are configured to display virtual imagery as admixed with a real-world background, for example via a see-through display system or via augmentation of a video image of the real-world background.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

Examples are disclosed that relate to placing a holographic object in and/or removing a holographic object from a displayed scene via a user-set trajectory. One disclosed example provides a computing device comprising a logic subsystem including a processor and memory storing instructions executable by the logic subsystem to display via a display system one or more holographic objects, receive depth image data from a depth image sensor, and detect a user input setting a trajectory for a selected holographic object. The instructions are further executable to, in response to detecting the user input setting the trajectory for the selected holographic object, determine the trajectory for the selected holographic object set by the user input, determine, based upon the depth image data and the trajectory, a surface intersected by the trajectory of the selected holographic object, and display via the display system the selected holographic object as travelling along the trajectory and changing in form upon encountering the surface.

DETAILED DESCRIPTION

An augmented or virtual reality system, such as a head-mounted display (HMD), may permit a user to interact with a displayed holographic object. For example, a user may interact with a holographic object to place the holographic object in a physical use environment or remove the holographic object from the use environment. To place a holographic object in a use environment, a user of an HMD may navigate to a displayed menu of holographic objects, manually select a holographic object from a displayed list, drag the holographic object from the list to a location within a field of view, and manually manipulate an orientation and/or a position of the holographic object. Removing a displayed hologram from the field of view may follow a similar paradigm, e.g. manually selecting the displayed holographic object, navigating through one or more menus, manually selecting to edit the displayed holographic object, and manually selecting to remove the displayed holographic object from view.

However, such methods of holographic object placement may be unintuitive and time-consuming, especially when interacting with a plurality of displayed virtual objects. Further, such methods may be disconnected from depth sensing of a surrounding real-world environment, and thus may result in holographic object placement in regions not bound by a real-world surface. For example, such methods may place a holographic object to appear as "floating" or suspended in space rather than resting on a surface. As another example, such methods may place a holographic object in a position, orientation, and/or surface alignment that is contextually inaccurate or difficult for interacting with the holographic object.

Accordingly, examples are disclosed that relate to placing holographic objects in a potentially more natural, intuitive, and surface-aware manner. Briefly, a user may place a holographic object by performing a user input that sets a motion trajectory for the holographic object. The user input may comprise, for example, a throwing or dropping gesture, a combination of gaze/voice or posture/voice that sets a holographic object trajectory, and/or any other suitable trajectory-setting input. Based on the user input, the display system determines a trajectory for the selected holographic object and also determines, based on image data, a surface that intersects the trajectory. The display system displays the selected holographic object as travelling along the trajectory and changing in form upon encountering the surface.

As a more specific example, in an augmented-reality scenario, a user may place an interactive holographic object by interacting with a smaller-form holographic object representing the interactive object in a menu. In such an example, the user may use a "pinch" gesture sensed by a depth camera to interact with the smaller-form holographic object. In response, the display device may show the smaller-form object as being lifted by the user via the pinch gesture. The user then may make a release gesture to simulate throwing or dropping of the object. Based upon the detect release gesture, the smaller-form holographic object may be displayed as following a realistic trajectory until it encounters a real-world surface. Upon reaching the real-world surface, the smaller-form holographic object may be displayed as "unpacking" to the corresponding larger-form holographic object (e.g. by an animated transition). This may include orienting the larger-form object to fit realistically against the real-world surface. The term "encounters a real-world surface" signifies that the holographic object has been determined to meet a collision condition with a depth map representation of the real-world surface.

A similar interaction may be used on the larger-form holographic object. For example, a user may use a grab gesture to lift the larger form holographic object, and then perform a release gesture analogous to a throw or drop gesture. Upon encountering a real-world surface, the larger-form holographic object may be displayed as collapsing into the corresponding smaller-form object and/or disappearing from display (and reappear at its location in the menu). This may be used, for example, to close a computer application or to remove a larger-form object from a displayed scene.

Figure 1:
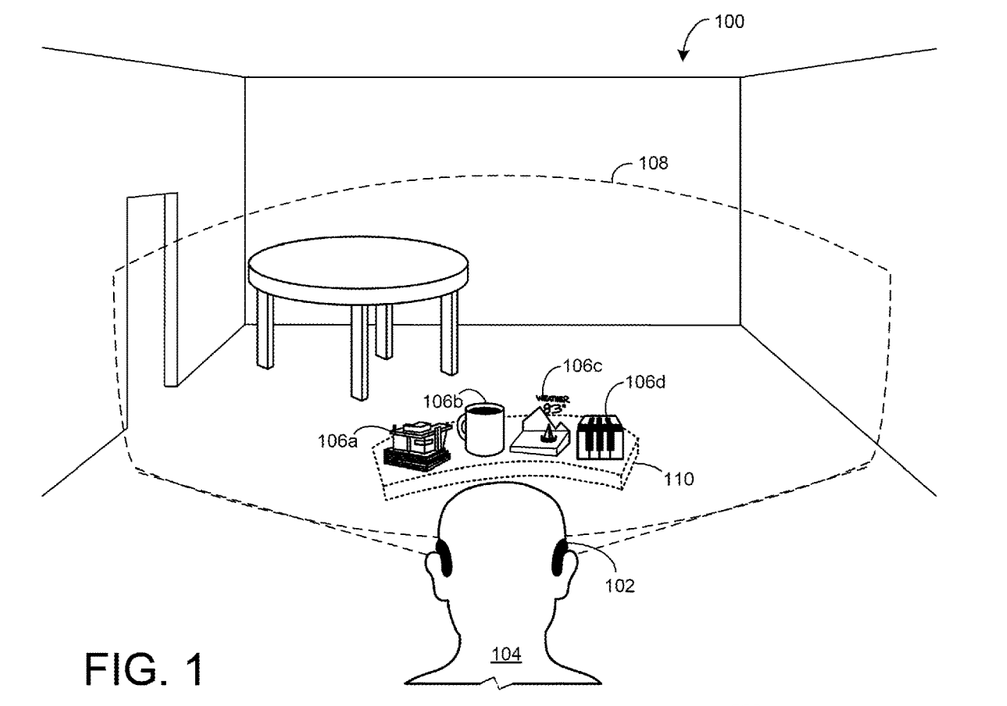
FIG. 1 depicts an example use scenario in which a head-mounted display device (HMD) displays holographic objects positioned in a stationary frame of reference.

FIG. 1 depicts an example use environment 100 in which an augmented reality display system 102 in the form of an HMD displays virtual imagery to a user 104 via a see-through display system such that at least a portion of a real-world background is viewable concurrently with the displayed virtual imagery. While described in the context of an augmented reality display system, it will be understood that examples described herein also may be enacted via a virtual reality display system or a video augmented reality display system in which a video image of a physical environment is obtained by a camera and then augmented with virtual image data. In this example, the HMD 102 displays a selection of smaller-form holographic objects 106a-106d in a field of view 108 of the user 104. Each smaller-form holographic object 106a-106d comprises a hologram that represents a corresponding larger-form object. In some examples, each smaller-form object may comprise a "packed" form of a corresponding larger-form object, where the packed form is configured to "unpack" upon encountering a real-world surface to reveal the corresponding larger-form object. In a more specific example, the smaller-form object 106d in FIG. 1 comprises a cube-shaped representation of a keyboard configured to unpack into a realistically-shaped larger-form keyboard upon encountering a real-world surface. The term "unpack" as used herein refers to a holographic object changing in form from a smaller-form object to a corresponding larger-form object. Such an unpacking may be displayed as an animated change, as an abrupt change, or in any other manner. In other examples, the smaller-form objects may have any other suitable appearance than a "packed" version of the larger-form object, and the transition from smaller to larger-form object may take any other suitable form than an "unpacking" animation.

In FIG. 1, each smaller-form object 106a-106d is displayed as positioned within a menu that takes the form of a holographic palette 110 in a stationary frame of reference for the real-world. The term "stationary frame of reference" indicates that the menu is fixed in position relative to the real-world as a user moves through the use environment 100. Each smaller-form object is displayed in the real-world using a coordinate location (e.g. Cartesian coordinates) within a coordinate system of the stationary frame of reference. In other examples, one or more smaller-form holographic objects may be displayed as world-locked without a holographic palette or other virtual support.

Figure 2:
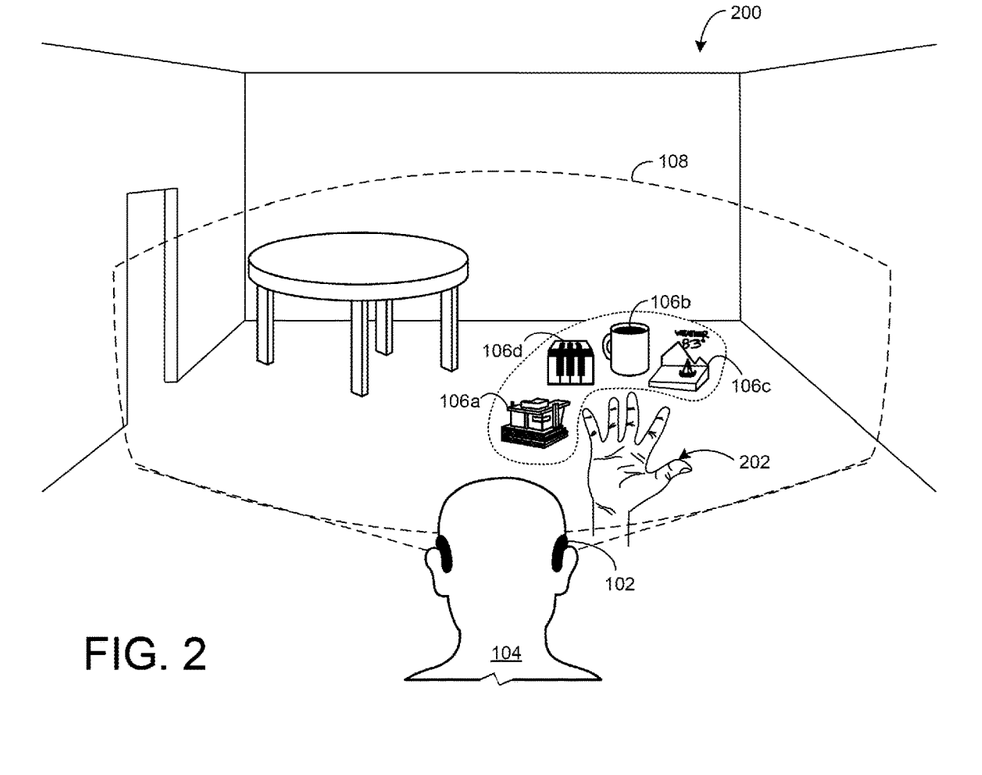
FIG. 2 depicts an example use scenario in which the HMD of FIG. 1 displays holographic objects positioned in a frame of reference attached to a hand of a user.

In other examples, a menu of smaller-form holographic objects may be displayed in an attached frame of reference that references an object other than the background world, such as part of a user's body. FIG. 2 depicts an example use scenario 200 in which the augmented reality display system 102 displays the selection of smaller-form objects 106a-106d as body-locked in a frame of reference attached to a hand 202 of the user 104. In this example, the user 104 orients the hand 202 such that a palm side of the hand 202 is within the field of view of the augmented reality display system 102, which triggers the augmented reality display system 102 to display a menu of smaller-form objects 106a-106d proximate to the hand 202. In other examples, the display of the smaller-form objects 106a-106d may be triggered in any suitable manner and as attached to any suitable reference frame.

Figure 3:
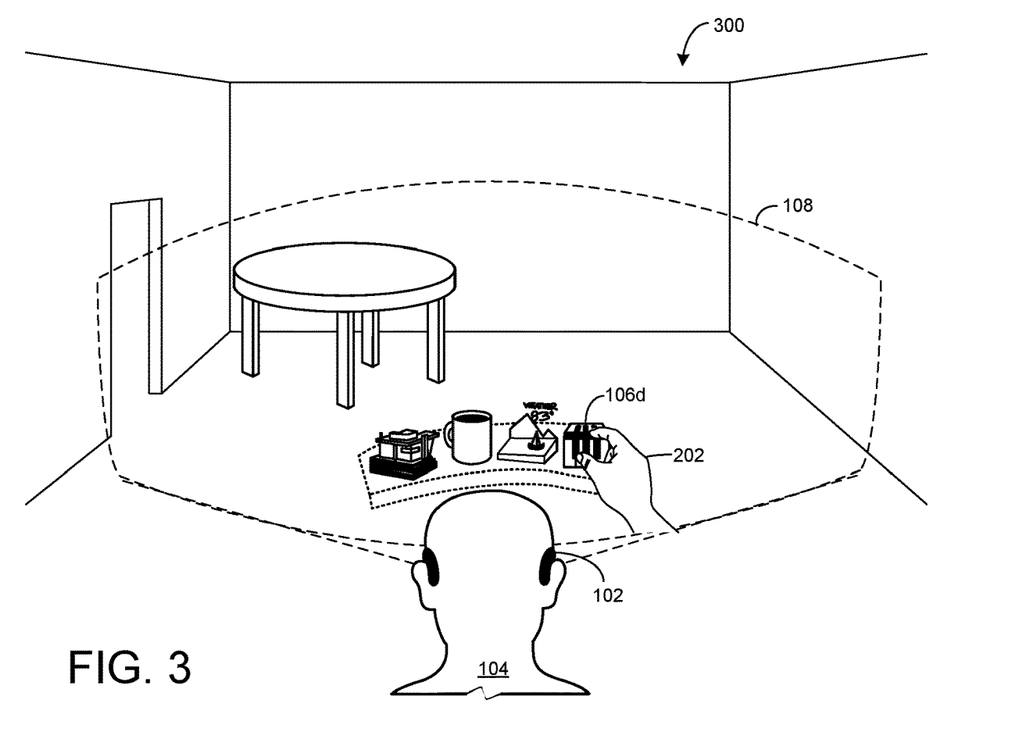
FIG. 3 depicts the example use scenario of FIG. 1 in which the HMD detects an example user grab gesture interacting with a selected holographic object.

As mentioned above, a user may open a holographic experience represented by a smaller-form holographic object by performing a user input that sets a motion trajectory for the selected holographic object, such as by using a gesture or sequence of gestures that represents dropping, throwing, or tossing of the holographic object. This may provide a more natural user interaction with displayed virtual content than navigating a series of menus and manually positioning and/or adjusting the display of virtual content. FIG. 3 depicts the user 104 of FIG. 1 selecting a holographic object by performing a grab gesture interacting with a selected holographic object 106d. As described in more detail below, the augmented reality display system 102 captures depth image data of the real-world use environment 300 and detects, via the depth image data, an appendage (hand 202) of the user 104 performing a grab gesture interacting with the selected holographic object 106d. For example, the augmented reality display system 102 may fit a skeletal model to each image in a series of depth images, and apply one or more gesture filters to detect whether the user has performed a recognized gesture. In response to detecting the grab gesture interacting with the selected holographic object 106d, the augmented reality display system 102 displays the selected holographic object 106d as spatially corresponding to the appendage(s) 202 of the user 104, e.g. to appear as if the user is holding the selected holographic object 106d.

In FIG. 3, the user 104 performs a pinch gesture via their hand 202 by touching their first digit to their thumb within a volume of the selected holographic object 106d. Other gestures also may be used to interact with a holographic object, such as pinch gestures using other fingers, or a grab gesture in which the hand 202 transitions from an open configuration (fingers extended) to a closed configuration (fingers contracted) within a volume of a selected holographic object. A grab gesture may be analogous to grasping a baseball, for example.

The augmented reality display system 102 may display the selected holographic object 106 as spatially associated with the hand 202 while the user maintains the grab gesture. As such, the selected holographic object 106d may be displayed as moving along with any movement of the hand. In the example of FIG. 3, the user 104 may maintain the grab gesture while moving hand 202 in the field of view 108 of the augmented reality display system 102 to move the selected holographic object 106d.

Figure 4:
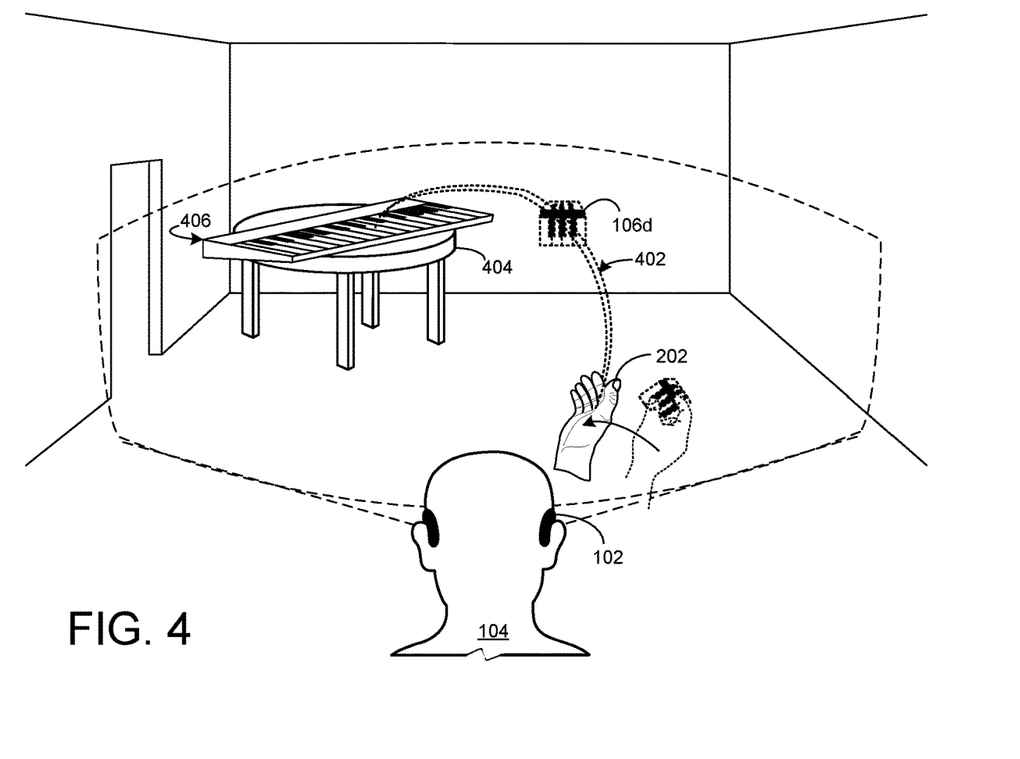
FIG. 4 depicts an example user release gesture releasing the selected holographic object of FIG. 3, and illustrates the selected holographic object travelling along a trajectory that leads to a table.

Gesture detection also may be used to detect a release of the holographic object, such as by cessation of a pinch or grab gesture. Motion that precedes the release of the holographic object may be used to determine a trajectory that the holographic object will be displayed as following upon release. FIG. 4 depicts an example user release gesture in the form of a throw, where the user 104 moves hand 202 while extending digits of the hand 202 to express an intent to release the selected holographic object 106d. In response, the augmented reality display system 102 determines a trajectory 402 for the selected holographic object 106d and displays the selected holographic object 106d as travelling along the trajectory 402. The illustrated trajectory may be based upon real-world physical phenomena such as gravity, air resistance, etc., and may be determined based upon a magnitude and velocity of the user hand motion preceding the release of the holographic object. The holographic object is then displayed as following the determined trajectory until encountering a real-world surface, illustrated in FIG. 4 as a table 404. In addition to determining the trajectory for the selected holographic object 106d, the augmented reality display system 102 identifies a real-world surface that intersects the trajectory 402. For example, the augmented reality display system 102 may build a depth map from depth images acquired of the use environment, or may obtain a previously-constructed depth map. The augmented reality display system 102 then may determine a real-world surface that intersects the determined trajectory based upon a current location of the holographic object in the depth map. In FIG. 4, a top surface of the table 404 intersects the trajectory 402. Thus, at the location at which the determined trajectory intersects the top surface of the table 404 in the depth map, the augmented reality display system 102 displays the selected holographic object 106d as "unpacking" from the smaller-form object 106d to a corresponding larger-form object 406 (a keyboard) upon encountering the top surface of the table 404. In the example shown in FIG. 4, the larger-form object 406 is centered on the top surface of the table 404 and oriented such that keys of the keyboard piano face in a direction of the user 104, but may be positioned differently in other examples.

At times, a user may unintentionally perform a wrist bounce or flick when releasing a holographic object, as these are natural body motions performed by some people when throwing. However, such wrist motions may be interpreted by the augmented reality display system 102 as a release in a different direction than the user intends. For example, a user performing a throw gesture may bend their wrist downwards at an end of the throw gesture, which may be incorrectly interpreted by the augmented reality display system as an intended release of a selected holographic object in a downward direction. Thus, to determine a trajectory that more closely resembles a user's intended trajectory, an augmented reality display system may use a filter to attenuate an influence of a subset of image frames on the trajectory determined. For example, a filtering algorithm for velocity may involve averaging a few final image frames (e.g. a final 2 to 6 image frames) corresponding to the user release gesture. Such a filtering algorithm may output a weighted average motion vector representing a speed and a direction of the gesture motion, where the weighted average vector is weighted towards earlier image frames corresponding to the user release gesture. This may help attenuate the influence of such unintentional wrist motions on a trajectory of a holographic object.

In other examples, other inputs than user hand gestures may be used to set a trajectory for a holographic object. For example, an eye tracking sensor may be used determine a user's gaze direction, which may be used to signify a location at which the user wishes to place a holographic object. A trajectory may be determined for the object, and travel of the holographic object along the trajectory may be triggered, for example, by speech input, button press, body gesture (e.g. head nod, head turn, eyelid motion), or any other suitable mechanism. A direction for the trajectory also may be set via a pointing gesture (as sensed via image data using, for example, an outward-facing image sensor of an HMD), or a determined head direction (e.g. as sensed by depth image data compared to a depth map and/or inertial motion sensor data), as examples.

Upon changing a form of a smaller-form object to a corresponding larger-form object, an augmented reality display system may reposition and/or reorient the larger-form object to align the larger-form object relative to a real-world surface. This may involve utilizing a "best fit" algorithm, for example, in which a size, shape, or other characteristic of the larger-form object is compared to a size, shape, or other characteristic of a surface on which the larger-form object is to be displayed. Further, the larger-form object may be aligned to orient interactive aspects of the larger-form object toward the user. As a more specific example, in FIG. 4, the keyboard 406 may be positioned on the table 404 such that the keys face the user 104.

Figure 5:
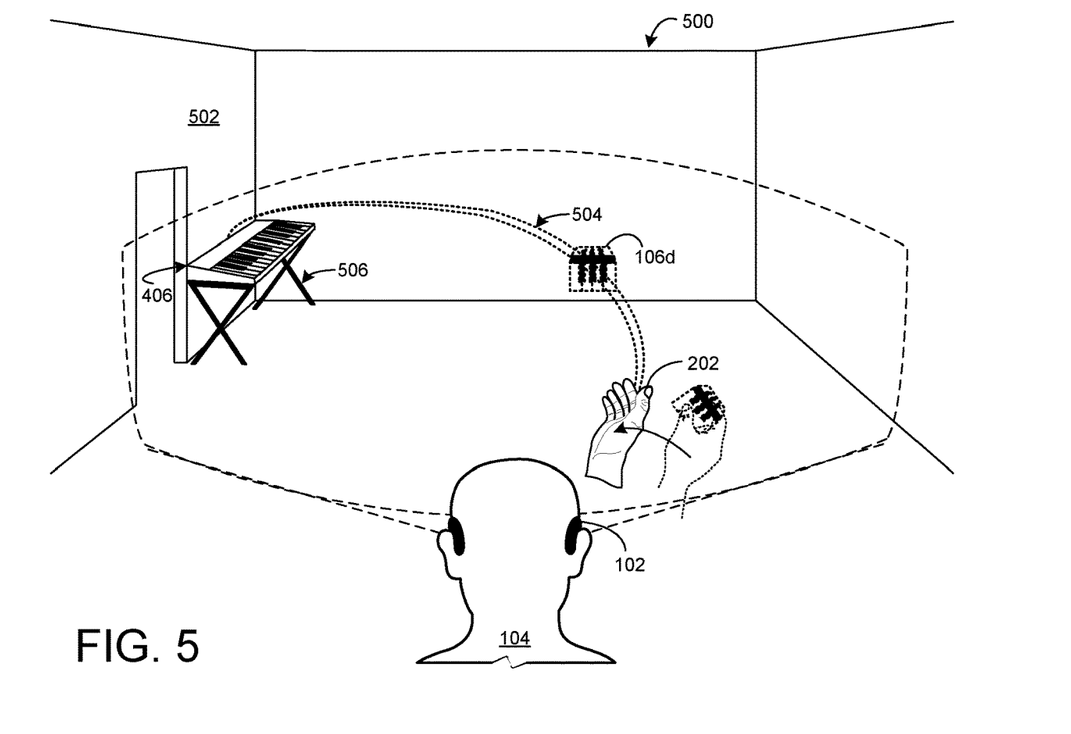
FIG. 5 depicts the selected holographic object of FIG. 3 travelling along a trajectory that intersects a wall.

In some examples, a holographic object may change in form differently based upon properties of the real-world surface encountered. FIG. 5 depicts an example use environment 500 in which the user 104 intends to open a holographic keyboard against a wall 502. In this example, the user 104 tosses the selected smaller-form object 106d towards the wall 502. The augmented reality display system 102 detects the release gesture, determines a trajectory 504 for the selected smaller-form object 106d, and determines that that smaller-form object 106d encounters a vertical surface 502 with no horizontal surface other than the floor beneath it. Based upon the vertical orientation of the surface 502, the augmented reality display system 102 displays a virtual stand 506 for the keyboard 406.

In the example of FIG. 5, the augmented reality display system may store surface-dependent metadata for a holographic object 106, wherein the surface-dependent metadata describes interactions with different types of surfaces. In the example of FIG. 5, the surface-dependent metadata may describe that the virtual stand 506 is displayed where the smaller-form object 106d encountered a wall and no table or other horizontal surface exists between the keyboard 406 and the floor. Such metadata also may specify information such as a predetermined height above a floor and/or orientation relative to a surface (e.g. a wall or floor) for displaying the holographic object. Such surface-dependent metadata may be set by user preference in some examples.

To determine types of surfaces in a use environment, an augmented reality display system may be configured to classify surfaces detected via depth image data or other image data and apply semantic labels to the surfaces based upon the classifications determined. For classified surfaces, regions in a depth map (e.g. regions of a surface reconstruction mesh depth map) corresponding to the classified surface may be replaced with a plane that is labeled with the determined semantic label for the surface. A semantic labeling module may be configured to recognize and label any suitable entities, including walls, ceilings, floors, doorways, chairs, tables, displays (e.g. monitors), stairs, and windows, as examples.

Figure 6:
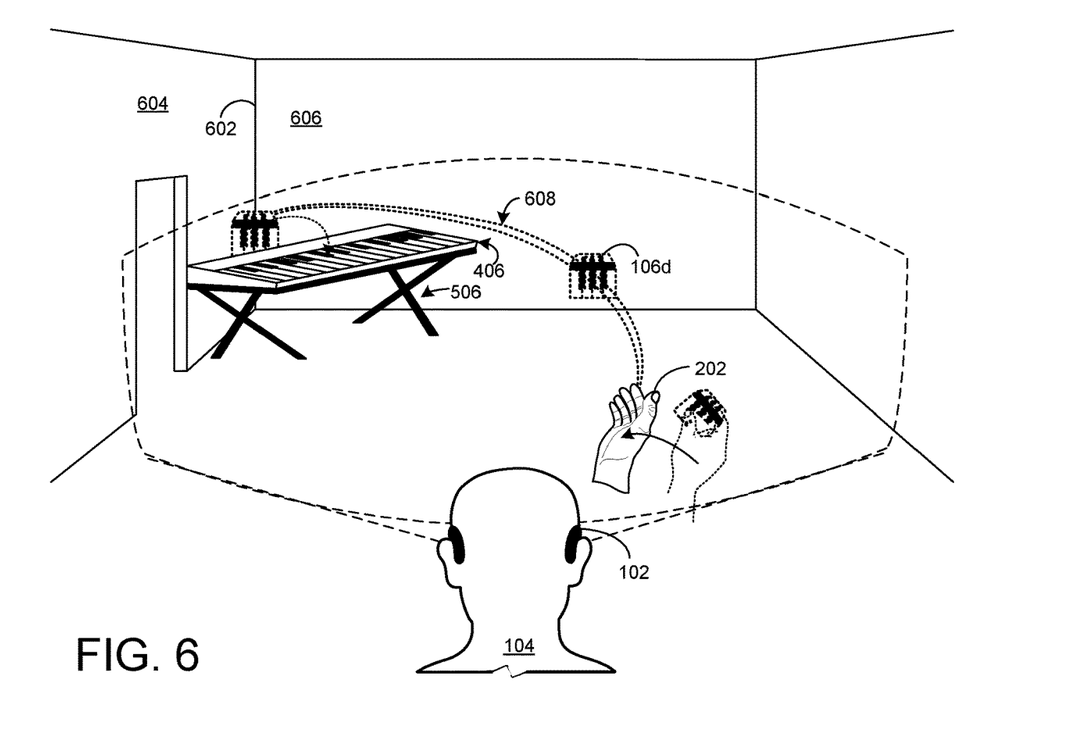
FIG. 6 depicts the selected holographic object of FIG. 3 as travelling along a trajectory that leads to a spatially constrained location between two surfaces.

In some instances, a trajectory may intersect a real-world surface at a location that is spatially constrained relative to a size of a larger-form hologram to be unpacked. FIG. 6 depicts an example use scenario 600 in which the user 104 tosses the selected holographic object 106d towards a corner 602 between a first wall 604 and a second wall 606. The augmented reality display device 102 detects the toss as a release gesture releasing the selected holographic object 106d and determines a trajectory 608 that intersects the corner 602. The area between the first wall 604 and the second wall 606 at the corner 602 is too small to accommodate the corresponding larger-form object (the keyboard). Such a spatial constraint may be determined by comparing a shape of the holographic object to a shape of the area in the depth map. In response, rather than display the selected holographic object 106d as changing in form upon encountering the corner 602, the augmented reality display system 102 may display the selected holographic object 106d as travelling along the trajectory 608, and upon encountering the corner 602, rebounding off the walls at the corner 602 to a location between the first and second walls with sufficient room to display the keyboard 406 at an angle between the first wall 604 and the second wall 606. Alternatively, the keyboard 406 may be moved laterally to be positioned flush against either the first wall 604 or the second wall 606. In yet other examples, the augmented reality display system may display a smaller-form object as unpacking to a corresponding larger-form object, and display an animation of the larger-form object bouncing off one or more surfaces to arrive at a real-world location suitable for the larger-form object. In other instances where the larger-form object cannot be placed in a location where the user 104 intended to place the object (e.g. due to spatial constraints), the augmented reality display system may "return" the holographic object to the user, e.g. by displaying the smaller-form object as returning to the hand of the user or to a displayed selection of smaller-form objects.

Figure 7:
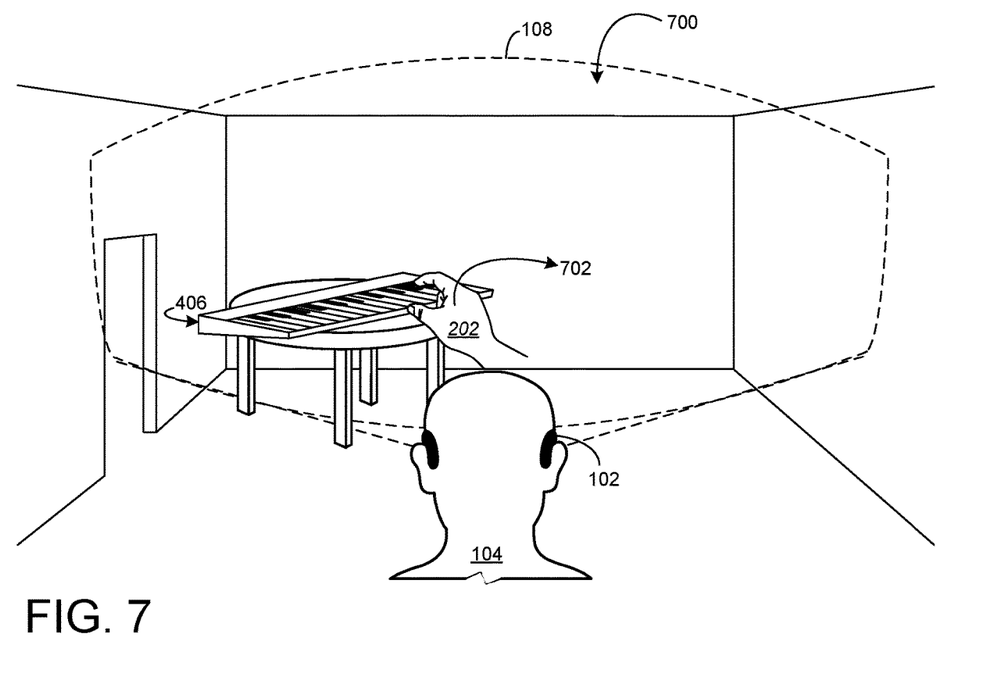
FIG. 7 depicts an example use scenario in which a user selects a larger-form holographic object via an example grab gesture.

The above-described examples relate to setting a trajectory for a smaller-form object that unpacks to a larger-form object. A similar paradigm may also be used to transition a larger-form object to a smaller-form object, for example, to remove a holographic object from display or replace a holographic object with a different holographic object. FIG. 7 depicts an example use scenario 700 in which the user 104 of the augmented reality display system 102 intends to remove the larger-form keyboard 406 from display. In this example, the user 104 interacts with the larger-form keyboard 406 by performing a pinch gesture within a volume of the larger-form keyboard piano 406, and the augmented reality display system 102 detects this interaction as a user input of a grab gesture selecting the larger-form keyboard 406. In response, the augmented reality display system 102 displays the larger-form keyboard 406 as spatially associated with the hand 202 of the user 104.

Figure 8:
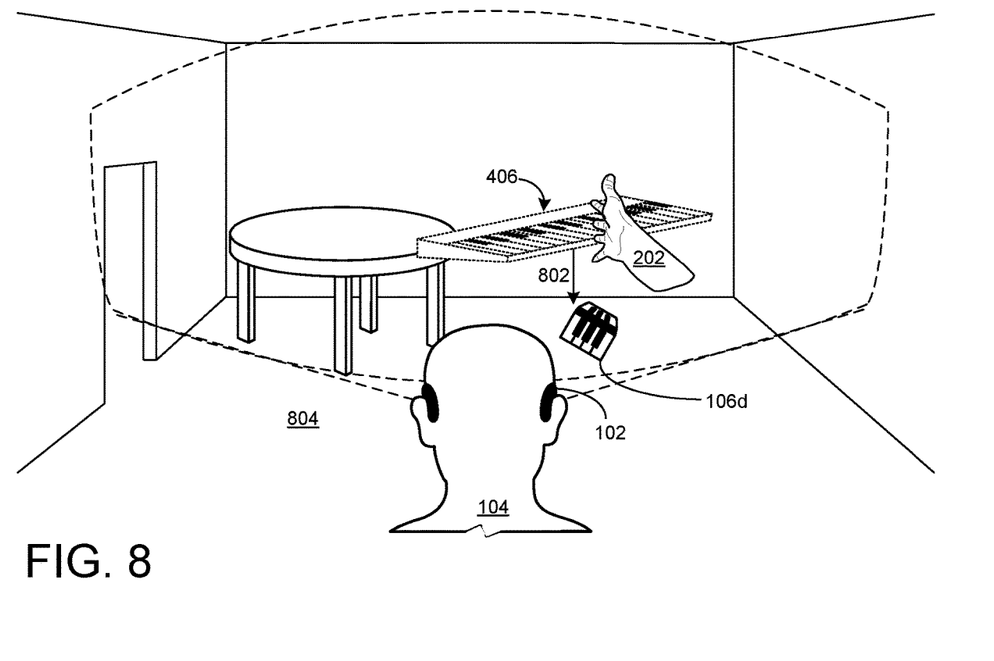
FIG. 8 depicts an example release gesture releasing the selected larger-form object of FIG. 7, and the selected larger-form object changing in form upon reaching a location of a real-world floor surface.

While performing the grab gesture, the user 104 moves hand 202 in a direction indicated by arrow 702. In response, the augmented reality display system 102 displays the larger-form keyboard 406 as moving according to movement of the hand 202. This may appear to the user 104 as "dragging" the larger-form object 406 via their hand 202. FIG. 8 depicts the user 104 performing another user input in the form of a release gesture releasing the selected larger-form object 406. The augmented reality display system 102 detects the release gesture as a user input setting a trajectory for the larger-form object 406, and in response, determines a trajectory 802 for the larger-form object 406. In this example, the augmented reality display system 102 detects that the determined trajectory intersects a floor 804. In response, the augmented reality display system 102 displays the larger-form object 406 as travelling along the trajectory 802 and as changing in form back to the smaller-form object 106d upon encountering the floor 804.

At times, a user may perform the gestures shown in FIGS. 7 and 8 to move a larger-form object to another location in the real-world, rather than to close the larger-form object. In some examples, an augmented reality display system may distinguish the user intent of such a gesture from a closing gesture by comparing a speed of a gesture motion between a user grab gesture and a user release gesture to a threshold speed, and moving the larger-form object instead of closing the larger-form object when the speed is below a threshold. When the speed is equal to or greater than the threshold (e.g. when a holographic object is thrown or tossed forcefully), the augmented reality display system may interpret the release gesture as releasing the larger-form object to close the larger-form object, and in response, display the larger-form object as closing.

While described in the context of placing and removing interactive holographic objects, the disclosed examples also may be used in other contexts, such as with an operating system start menu.

Figure 9:
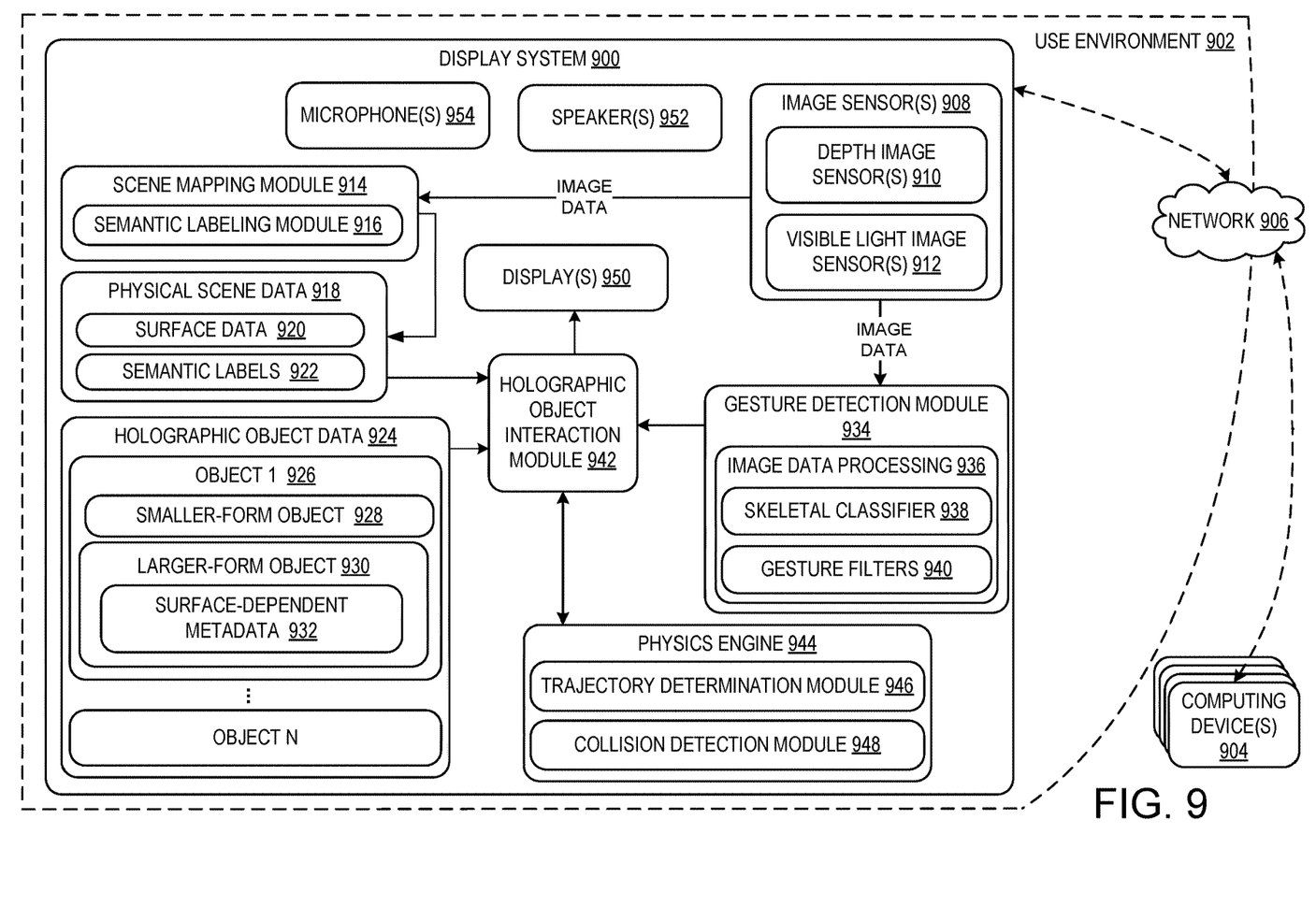
FIG. 9 is a block diagram illustrating an example augmented reality display system.

FIG. 9 is a block diagram illustrating an example use environment 902 comprising a display system 900. In some examples, the display system 900 may comprise a head-mounted display device, such as the augmented reality display device 102 of FIGS. 1 through 8. In other examples, the display system 900 may comprise a virtual reality display system or a video augmented reality system. FIG. 9 illustrates example components and modules that may be used to transition between large-form and small-form holographic objects in the manners disclosed above, and omits other components for clarity. In some examples, all logic may be executed locally on the display system 900. In other examples, some logic may be executed remotely, such as by one or more remotely located computing devices 904 via a computer network 906, or by another local device (e.g. a network edge device).

The display system 900 comprises one or more image sensors 908 configured to capture image data of a real-world surroundings. The one or more image sensors include a depth image sensor(s) 910 configured to capture depth image data, and optionally may include a visible light image sensor(s) 912 configured to capture visible light image data. Examples of suitable depth sensors for use as depth image sensor 910 include a time of flight camera, a depth camera, and a stereo camera arrangement. Examples of suitable visible light image sensors for use as visible light sensors 912 include an RGB camera and a grayscale camera.

The display system 900 further comprises computing hardware, such as memory and logic devices, examples of which are described below in the context of FIG. 11. Various software, firmware, and/or hardware modules may be implemented in such computing hardware. For example, the display system 900 comprises a scene mapping module 914 configured to receive image data (depth and optionally visible light) from the one or more image sensors 908 and generate a three-dimensional surface reconstruction or other depth map of the use environment 902 based at least on the image data received. In some examples, the scene mapping module 914 may comprise a semantic labeling module 916 configured to classify one or more surfaces identified in the depth map and semantically label each classified surface. The semantic labeling module 916 may utilize local classifiers (e.g. machine-trained models, such as a neural network, convolution neural network, residual neural network, etc.), or may communicate image data to remote computing devices 904 for classification and semantic labeling.

The display system 900 may store the depth map generated by the scene mapping module 914 as physical scene data 918. The physical scene data 918 includes surface data 920, and also may include semantic labels 922. In some examples, the surface data 920 may comprise a surface reconstruction (e.g. a mesh representation of the surface), and further may comprise processed depth data in which portions of mesh data are replaced with planes corresponding to identified surfaces. Semantic labels 922 may be applied to any suitable surfaces that the semantic labeling module has been trained to recognize. Examples include tables, walls, floors, chairs, stairs, ceilings, displays, doorways, and windows).

In addition to physical scene data 918, the display system 900 stores holographic object data 924 comprising information regarding holographic objects associated with applications that are executable by the display system 900. The depicted holographic object data 924 comprises data for each of one or more holographic objects, indicated as objects 1 through N. Data stored for each object 926 may comprise instructions for displaying a smaller-form object 928 and a corresponding larger-form object 930. These instructions may specify a size, a shape, a color, and/or other characteristics for displaying each of the smaller form object 928 and the corresponding larger form of the object 930. The smaller-form object data may be displayed in a toolbar, menu, or other selectable user interface, while the larger-form object data may be displayed when a holographic application is opened.

The object data for each holographic object 1 through N further may comprise surface-dependent metadata 932 describing how an object is to be displayed based upon the surface that the object encounters during user interaction. As one specific example, surface-dependent metadata 932 for a holographic keyboard may comprise instructions for displaying the larger-form keyboard differently when the smaller-form keyboard encounters a table than when the smaller-form keyboard encounters a wall. The surface-dependent metadata 932 may be based upon predetermined characteristics of an object. For example, when the object comprises a virtual television, the surface-dependent metadata 932 may comprise a standard viewing height for a television on a wall, and instructions for displaying a virtual television stand supporting the object in an upright position when the object encounters a table or a floor. In some examples, surface-dependent metadata may be specified by user input.

The display system 900 further comprises a gesture detection module 934 configured to receive image data (depth and/or visible light) from the one or more image sensors 908 and processes the image data via an image processing component 936 to detect possible user gestures. The image processing component 936 comprises a skeletal classifier 938 configured to detect and classify an object as a skeleton or part of a skeleton. For example, the skeletal classifier 938 may fit a skeletal model to depth image data received in which a skeleton is represented by a collection of nodes that represent locations of the human body and that are connected in a form that approximates the form of the human body. In a more specific example, the skeletal classifier 938 may be configured to detect and classify a hand or other appendage(s) of a user when the appendage(s) is within a field of view of the image sensor(s) 908.

The image processing component 936 comprises one or more gesture filters 940 configured to detect gestures performed by a user. Example gesture filters 940 include one or more filters for recognizing a user grab gesture(s) (e.g. a grab, a pinch, etc.) and one or more filters for a user release gesture(s) (e.g. a throw, a toss, a drop, etc.).

The display system 900 further comprises a holographic object interaction module 942 configured to detect user interactions with displayed holographic objects that are intended to transition the objects between smaller-form objects (e.g. as displayed in a menu) and larger-form objects (e.g. an interactive hologram associated with an application that is launched by the user interactions described herein). The holographic object interaction module 942 receives gesture data from the gesture detection module 934, physical scene information from the physical scene data 918, and also receives holographic object data 924, e.g. regarding the locations of displayed holographic objects compared to real-world surfaces and objects (e.g. user fingers, tables, floor, walls, etc.).

When a grab or pinch gesture is detected that intersects the location of a displayed holographic object, the holographic object interaction module 942 may display the relevant holographic object as being associated positionally with the user's hand while the gesture is maintained. Further, when a release gesture is detected, data regarding the release gesture (e.g. velocity, direction, etc.) may be provided to a physics engine 944, which determines a trajectory for the holographic object via a trajectory determination module 946. Example physics engines include those incorporated in the Unity game engine, available from Unity Technologies of San Francisco, Calif.

Physical scene data 918 also may be provided to a collision detection module 948 of the physics engine 944. The collision detection module 948 compares the trajectory determined by the trajectory determination module 946 to physical scene data 918, and determines a location at which the trajectory intersects a surface of the use environment 902. In some examples, collision detection may be performed by a physics engine by determining the location at which a box collider associated with the holographic object collides with the surface of the use environment 902.

The holographic object interaction module 942 receives a determined trajectory and a real-world surface that intersects the trajectory from the physics engine 944. Based upon this information, the holographic object interaction module 942 may determine the type of surface that the trajectory intersects, an orientation in which to display an object, whether to display a different version of an object (e.g. a keyboard with a stand or without a stand), and/or perform any other suitable determinations. Such determinations may be performed, for example, using Placeable.cs, available from Microsoft Corporation of Redmond, Wash. Placeable.cs may be used, for example, to determine if a larger-form holographic object will fit on a surface by raycasting from the center and four corners of a bounding shape associated with the larger-form holographic object; to check the surface normal to determine if it is smooth enough for the larger-form holographic object to sit flush on; to re-orient the larger-form holographic object to align with the surface type (vertical or horizontal) to which it has affinity; and to place the larger-form holographic object on the selected surface upon animating an unpacking (or other suitable transition) from the smaller-form holographic object to the larger-form holographic object.

The holographic object interaction module 942 then outputs, to one or more displays 950, the selected object as travelling the trajectory and as changing form upon encountering the real-world surface. The one or more displays 950 may be see-through with respect to a real-world background, or may be opaque. In addition to a display(s) 950, the display system 900 may comprise one or more other output devices and/or input devices. For example, the display system 900 may include one or more speakers 952 configured to output audio, one or more microphones 954, and various other input and output devices not shown in FIG. 9.

Figure 10:
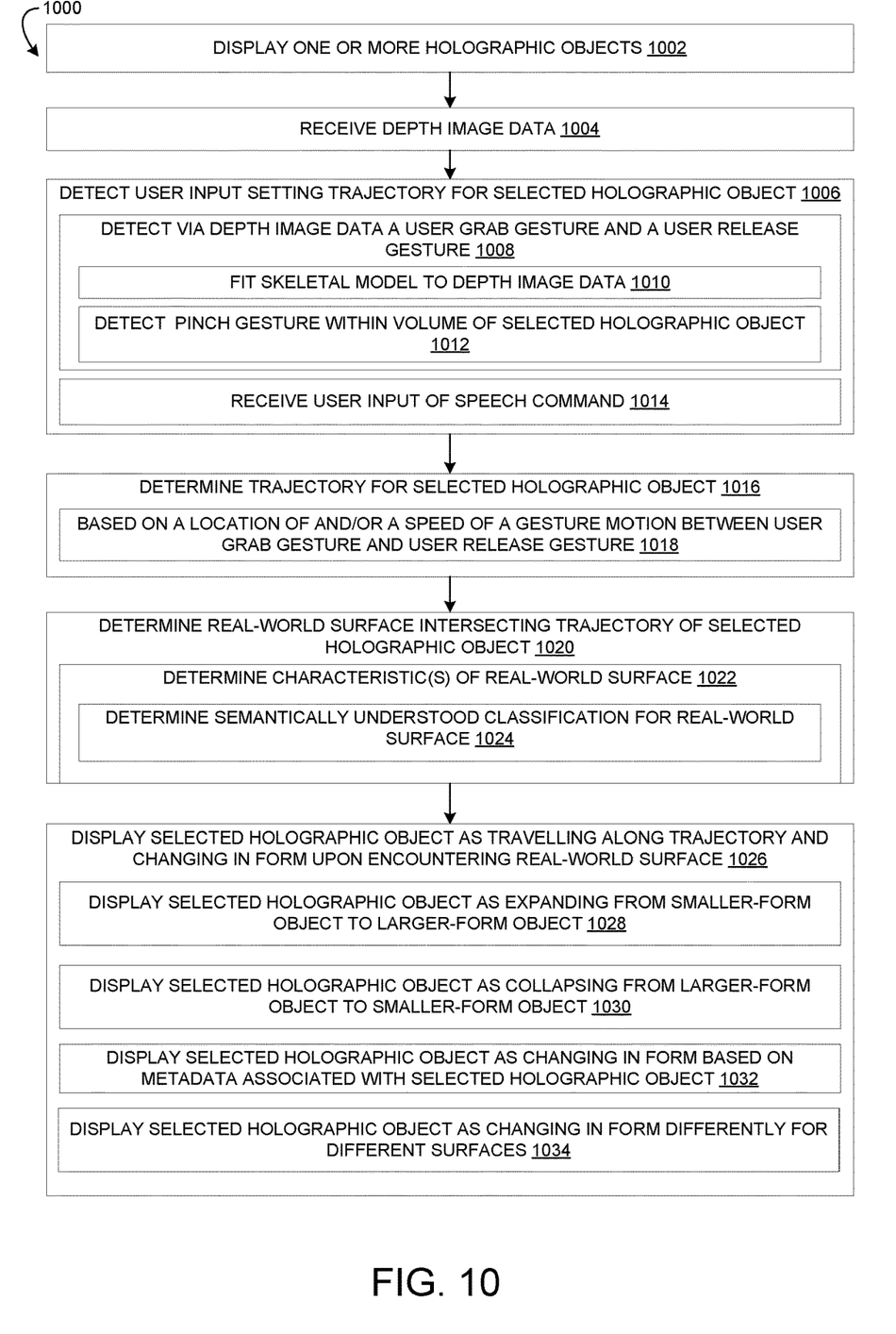
FIG. 10 is a flow diagram illustrating an example method of placing and/or removing holographic objects via a trajectory set by user input.

FIG. 10 is a flow diagram illustrating an example method 1000 for setting a trajectory for a holographic object via user input. Method 1000 may be implemented as stored instructions executable by a logic subsystem of an augmented reality system, such as the augmented reality display system 102 and/or the display system 900. Method 1000 may also be implemented as stored instructions executable by a logic subsystem of a virtual reality system or a video augmented reality system.

At 1002, method 1000 comprises displaying, via a display system, one or more holographic objects. The one or more holographic objects displayed may comprise one or more smaller-form objects corresponding to a larger-form objects, and/or may comprise one or more larger-form objects. In some examples, displaying the one or more holographic objects comprises displaying as world-locked content in a stationary frame of reference. In other examples, displaying the one or more holographic objects comprises displaying the one or more holographic objects in an attached frame of reference.

At 1004, method 1000 comprises receiving depth image data. The depth image data may be received from an on-board depth image sensor(s), or from a source external to the augmented reality display device.

At 1006, method 1000 comprises detecting a user input setting a trajectory for a selected holographic object. In some examples, the user input may comprise a user grab gesture and a user release gesture detected via image data (e.g. depth image data), as indicated at 1008. In such an example, the augmented reality system may fit a skeletal model to a user's appendage detected in the depth image data, as indicated at 1010, and the skeletal data may be provided to gesture filters to identify gestures. In one specific example, an augmented reality display system may detect a hand of a user performing a pinch gesture within a volume of a selected holographic object as a user grab gesture interacting with the selected holographic object, as indicated at 1012. In other examples, detecting the user input comprises receiving user input of a speech command setting the trajectory for the selected holographic object, as indicated at 1014.

At 1016, method 1000 comprises determining a trajectory for the selected holographic object. The trajectory may be determined in any suitable manner. In some examples, determining the trajectory comprises providing gesture data to a physics engine regarding a location and/or a speed of a gesture motion between the grab and release gestures, and receiving a trajectory from the physics engine, as indicated at 1018. Further, in some examples, determining the trajectory comprises determining an average vector for a velocity of a motion preceding a release gesture by filtering two or more final image frames corresponding to the detected user release gesture and obtaining an average vector that more heavily weights velocity in earlier image frames than those immediately prior to the release gesture.

At 1020, method 1000 comprises determining a real-world surface intersected by the trajectory of the selected holographic object. The augmented reality system may determine the real-world surface by mapping the trajectory determined in a depth map of a use environment and determining a location at which the trajectory intersects the depth map. In some examples, determining the real-world surface comprises determining a characteristic of the real-world surface, as indicated at 1022. This may involve determining a semantically understood classification for the real-world surface, as indicated at 1024. For example, the augmented reality system may input depth image data into a classifier configured to identify one or more surfaces and/or other entities and provide a label for each recognized surface and/or entity. In a more specific example, determining the semantically understood classification for the real-world surface may comprise determining whether the real-world surface comprises a wall, a floor, a ceiling, a stairway, a chair, a table, a window, a display (e.g. a monitor), or a doorway.

At 1026, method 1000 comprises displaying, via the display system, the selected holographic object as travelling along the trajectory and changing in form upon encountering the real-world surface. When the selected holographic object comprises a smaller-form object, displaying the selected holographic object as changing in form may comprise displaying the smaller-form holographic object as expanding to a corresponding larger-form object, as indicated at 1028. When the selected holographic object comprises a larger-form object, displaying the selected holographic object as changing in form may comprise displaying the larger-form object as collapsing into a corresponding smaller-form object, as indicated at 1030. In some examples, displaying the selected holographic object as changing in form may comprise displaying the holographic object as changing in form based on metadata associated with the selected holographic object, as indicated at 1032. Such metadata may describe a size, a shape, and/or other characteristics for displaying the selected holographic in each of the smaller-form and the larger-form, as examples. Such metadata also may include instructions for displaying the selected holographic object as changing in form differently for different surface encounters. Thus, in some examples, displaying the selected holographic object as changing in form comprises displaying the selected holographic object as changing in form differently for different surfaces, as indicated at 1034. This may help provide, for example, a realistic user experience in which holographic objects interact with a real-world surface similar to an interaction between a corresponding real-world object and the real-world surface.

In some embodiments, the methods and processes described herein may be tied to a computing system of one or more computing devices. In particular, such methods and processes may be implemented as a computer-application program or service, an application-programming interface (API), a library, and/or other computer-program product.

Figure 11:
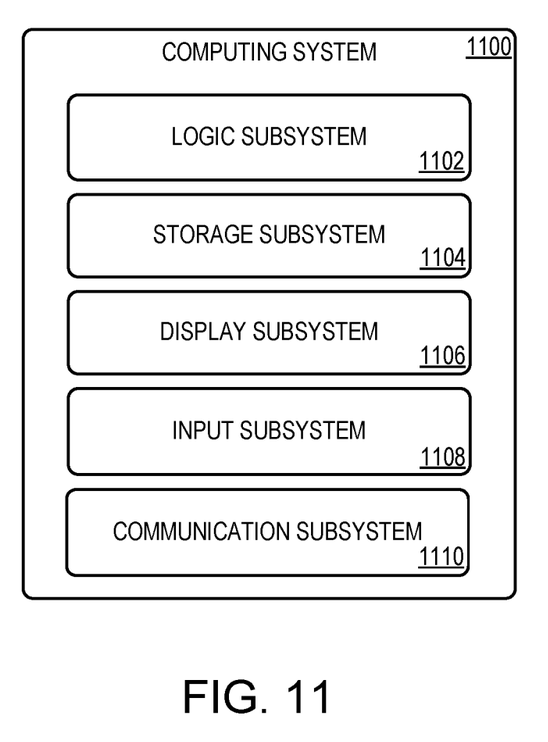
FIG. 11 is a block diagram illustrating an example computing system.

FIG. 11 schematically shows an example computing system 1100 that can enact one or more of the methods and processes described above. Computing system 1100 is shown in simplified form. Computing system 1100 may take the form of one or more personal computers, server computers, tablet computers, home-entertainment computers, network computing devices, gaming devices, mobile computing devices, mobile communication devices (e.g., smart phone), head-mounted display devices (e.g. augmented reality display systems 102 and 900), and/or other computing devices.

Computing system 1100 includes a logic machine 1102 and a storage machine 1104. Computing system 1100 may optionally include a display subsystem 1106, input subsystem 1108, communication subsystem 1110, and/or other components not shown in FIG. 11.

Logic machine 1102 includes one or more physical devices configured to execute instructions. For example, the logic machine may be configured to execute instructions that are part of one or more applications, services, programs, routines, libraries, objects, components, data structures, or other logical constructs. Such instructions may be implemented to perform a task, implement a data type, transform the state of one or more components, achieve a technical effect, or otherwise arrive at a desired result.

The logic machine may include one or more processors configured to execute software instructions. Additionally or alternatively, the logic machine may include one or more hardware or firmware logic machines configured to execute hardware or firmware instructions. Processors of the logic machine may be single-core or multi-core, and the instructions executed thereon may be configured for sequential, parallel, and/or distributed processing. Individual components of the logic machine optionally may be distributed among two or more separate devices, which may be remotely located and/or configured for coordinated processing. Aspects of the logic machine may be virtualized and executed by remotely accessible, networked computing devices configured in a cloud-computing configuration.

Storage machine 1104 includes one or more physical devices configured to hold instructions executable by the logic machine to implement the methods and processes described herein. When such methods and processes are implemented, the state of storage machine 1104 may be transformed—e.g., to hold different data.

Storage machine 1104 may include removable and/or built-in devices. Storage machine 1104 may include optical memory (e.g., CD, DVD, HD-DVD, Blu-Ray Disc, etc.), semiconductor memory (e.g., RAM, EPROM, EEPROM, etc.), and/or magnetic memory (e.g., hard-disk drive, floppy-disk drive, tape drive, MRAM, etc.), among others. Storage machine 1104 may include volatile, nonvolatile, dynamic, static, read/write, read-only, random-access, sequential-access, location-addressable, file-addressable, and/or content-addressable devices.

It will be appreciated that storage machine 1104 includes one or more physical devices. However, aspects of the instructions described herein alternatively may be propagated by a communication medium (e.g., an electromagnetic signal, an optical signal, etc.) that is not held by a physical device for a finite duration.

Aspects of logic machine 1102 and storage machine 1104 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

The terms "module," "program," and "engine" may be used to describe an aspect of computing system 1100 implemented to perform a particular function. In some cases, a module, program, or engine may be instantiated via logic machine 1102 executing instructions held by storage machine 1104. It will be understood that different modules, programs, and/or engines may be instantiated from the same application, service, code block, object, library, routine, API, function, etc. Likewise, the same module, program, and/or engine may be instantiated by different applications, services, code blocks, objects, routines, APIs, functions, etc. The terms "module," "program," and "engine" may encompass individual or groups of executable files, data files, libraries, drivers, scripts, database records, etc.

It will be appreciated that a "service", as used herein, is an application program executable across multiple user sessions. A service may be available to one or more system components, programs, and/or other services. In some implementations, a service may run on one or more server-computing devices.

When included, display subsystem 1106 may be used to present a visual representation of data held by storage machine 1104. This visual representation may take the form of a graphical user interface (GUI). As the herein described methods and processes change the data held by the storage machine, and thus transform the state of the storage machine, the state of display subsystem 1106 may likewise be transformed to visually represent changes in the underlying data. Display subsystem 1106 may include one or more display devices utilizing virtually any type of technology. Such display devices may be combined with logic machine 1102 and/or storage machine 1104 in a shared enclosure, or such display devices may be peripheral display devices.

When included, input subsystem 1108 may comprise or interface with one or more user-input devices such as a keyboard, mouse, touch screen, or game controller. In some embodiments, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition; as well as electric-field sensing componentry for assessing brain activity.

When included, communication subsystem 1110 may be configured to communicatively couple computing system 1100 with one or more other computing devices. Communication subsystem 1110 may include wired and/or wireless communication devices compatible with one or more different communication protocols. As non-limiting examples, the communication subsystem may be configured for communication via a wireless telephone network, or a wired or wireless local- or wide-area network. In some embodiments, the communication subsystem may allow computing system 1100 to send and/or receive messages to and/or from other devices via a network such as the Internet.

Another example provides a computing device, comprising a logic subsystem comprising a processor, and memory storing instructions executable by the logic subsystem to display via a display system one or more holographic objects, receive depth image data from a depth image sensor, detect a user input setting a trajectory for a selected holographic object, in response to detecting the user input setting the trajectory for the selected holographic object, determine the trajectory for the selected holographic object set by the user input, determine, based upon the depth image data and the trajectory, a surface intersected by the trajectory of the selected holographic object, and display via the display system the selected holographic object as travelling along the trajectory and changing in form upon encountering the surface. In such an example, the instructions may additionally or alternatively be executable to detect the user input setting the trajectory for the selected holographic object by detecting via the depth image data a user grab gesture interacting with the selected holographic object, and detecting via the depth image data a user release gesture releasing the selected holographic object. In such an example, the instructions may additionally or alternatively be executable to determine the trajectory for the selected holographic object based on one or more of a location of and/or a speed of a gesture motion between the user grab gesture and the user release gesture. In such an example, the instructions may additionally or alternatively be executable to detect via the depth image data the user grab gesture by detecting a hand of the user performing a pinch gesture within a volume of the selected holographic object. In such an example, the instructions may additionally or alternatively be executable to detect the user grab gesture by fitting a skeletal model to the depth image data. In such an example, the instructions may additionally or alternatively be executable to detect the user input setting the trajectory for the selected holographic object by receiving user input of one or more of a speech command, a gaze direction, a head direction, a button press, a pointing gesture, and/or a body gesture. In such an example, the instructions may additionally or alternatively be executable to determine one or more characteristics of the surface, and to display via the see-through display system the selected holographic object as changing in form differently for different characteristics of the surface. In such an example, the instructions may additionally or alternatively be executable to display the selected holographic object as changing in form by displaying the selected holographic object as expanding from a smaller-form object that represents a corresponding larger-form object to the corresponding larger-form object. In such an example, the display system may additionally or alternatively comprise a see-through display system. In such an example, the computing device may additionally or alternatively comprise a head-mounted display device.

Another example provides a method enacted on a computing device, the method comprising displaying via a display system one or more holographic objects, receiving depth image data from a depth image sensor, detecting a user input setting a trajectory for a selected holographic object, in response to detecting the user input setting the trajectory for the selected holographic object, determining the trajectory for the selected holographic object set by the user input, determining, based upon the depth image data and the trajectory, a surface intersected by the trajectory of the holographic object, and displaying via the display system the selected holographic object as travelling along the trajectory and changing in form upon encountering the surface. In such an example, the method may additionally or alternatively comprise determining one or more characteristics of the surface, and displaying via the display system the holographic object as changing in form differently for different characteristics of the surface. In such an example, displaying the selected holographic object as changing in form may additionally or alternatively comprise displaying the selected holographic object as expanding from a smaller-form object that represents a corresponding larger-form object to the corresponding larger-form object. In such an example, determining the surface intersected by the trajectory comprises determining a location at which a box collider associated with the selected holographic object collides with the surface. In such an example, detecting the user input setting the trajectory for the selected holographic object may additionally or alternatively comprise detecting via the depth image data a user grab gesture interacting with the selected holographic object, and detecting via the depth image data a user release gesture releasing the selected holographic object. In such an example, detecting via the depth image data the user grab gesture may additionally or alternatively comprise fitting a skeletal model to the depth image data. In such an example, determining the trajectory for the selected holographic object may additionally or alternatively comprise determining based on one or more of a location of and/or a speed of a gesture motion between the user grab gesture and the user release gesture. In such an example, detecting the user input setting the trajectory for the selected holographic object may additionally or alternatively comprise receiving user input of one or more of a speech command, a gaze direction, a head direction, a button press, a pointing gesture, and/or a body gesture.

Another example provides a head-mounted display device, comprising a see-through display system, a depth image sensor, a logic subsystem comprising one or more processors, and memory storing instructions executable by the logic subsystem to display, via the see-through display system, one or more holographic objects, receive depth image data from the depth image sensor, detect a user input setting a trajectory for a selected holographic object, in response to detecting the user input setting the trajectory for the selected holographic object, determine a trajectory for the selected holographic object set by the user input, determine, based upon the depth image data and the trajectory, a real-world surface intersected by the trajectory of the selected holographic object, determine a semantically understood classification for the real-world surface, and display the selected holographic object as travelling along the trajectory and, upon encountering the real-world surface, changing in form based at least upon the semantically understood classification for the real-world surface. In such an example, the instructions may additionally or alternatively be executable to display the selected holographic object as changing in form upon encountering the real-world surface based further upon metadata associated with the selected holographic object.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. A computing device, comprising:
   a logic subsystem comprising a processor; and
   memory storing instructions executable by the logic subsystem to
      display via a display system one or more holographic objects,
      receive depth image data from a depth image sensor,
      detect a user input setting a trajectory for a selected holographic object,
      in response to detecting the user input setting the trajectory for the selected holographic object, determine the trajectory for the selected holographic object set by the user input,
      determine, based upon the depth image data and the trajectory, a real-world surface intersected by the trajectory of the selected holographic object,
      when the real-world surface has a first property, display using the display system the selected holographic object as travelling along the trajectory and changing in form from a smaller-form object to a first representation of a larger-form object upon encountering the real-world surface, the larger-form object being an interactive holographic experience, and the smaller-form object being a representation of the interactive holographic experience in a closed state, and when the real-world surface has a second property different from the first property, display using the display system the selected holographic object as traveling along the trajectory and upon encountering the real-world surface changing from the smaller-form object into a second representation of the larger-form object that is different than the first representation.

2. The computing device of claim 1, wherein the instructions are executable to detect the user input setting the trajectory for the selected holographic object by detecting via the depth image data a user grab gesture interacting with the selected holographic object, and detecting via the depth image data a user release gesture releasing the selected holographic object.

3. The computing device of claim 2, wherein the instructions are executable to determine the trajectory for the selected holographic object based on one or more of a location of and/or a speed of a gesture motion between the user grab gesture and the user release gesture.

4. The computing device of claim 2, wherein the instructions are executable to detect via the depth image data the user grab gesture by detecting a hand of the user performing a pinch gesture within a volume of the selected holographic object.

5. The computing device of claim 2, wherein the instructions are executable to detect the user grab gesture by fitting a skeletal model to the depth image data.

6. The computing device of claim 1, wherein the instructions are executable to detect the user input setting the trajectory for the selected holographic object by receiving user input of one or more of a speech command, a gaze direction, a head direction, a button press, a pointing gesture, and/or a body gesture.

7. The computing device of claim 1, wherein the instructions are executable to display the selected holographic object as changing in form by displaying an animation of the selected holographic object as expanding from the smaller-form object to the larger-form object.

8. The computing device of claim 1, wherein the display system comprises a see-through head-mounted display system.

9. The computing device of claim 1, wherein the computing device comprises a head-mounted display device.

10. The computing device of claim 1, wherein the instructions are further executable to detect via the depth image data a user grabbing the first representation of larger-form object or the second representation of the larger-form object, detect via the depth image data a user performing a closing gesture, and in response display the first representation of the larger-form object or the second representation of the larger-form object as changing in form to the smaller-form object.

11. A method enacted on a computing device, the method comprising:
displaying via a display system one or more holographic objects;
receiving depth image data from a depth image sensor;
detecting a user input setting a trajectory for a selected holographic object;
in response to detecting the user input setting the trajectory for the selected holographic object, determining the trajectory for the selected holographic object set by the user input;

determining, based upon the depth image data and the trajectory, a real-world surface intersected by the trajectory of the holographic object; and when the real-world surface has a first property, displaying the display system the selected holographic object as travelling along the trajectory and changing in form from a smaller-form object to a first representation of a larger-form object upon encountering the real-world surface, the larger-form object being an interactive holographic experience, and the smaller-form object being a representation of the interactive holographic experience in a closed state, and when the real-world surface has a second property different from the first property, displaying using the display system the selected holographic object as traveling along the trajectory and upon encountering the real-world surface changing from the smaller-form object into a second representation of the larger-form object that is different than the first representation.

12. The method of claim 11, further comprising determining one or more characteristics of the real-world surface, and displaying via the display system the holographic object as changing in form differently for different characteristics of the real-world surface.

13. The method of claim 11, wherein displaying the selected holographic object as changing in form comprises displaying an animation of the selected holographic object as expanding from the smaller-form object to the larger-form object.

14. The method of claim 11, wherein determining the real-world surface intersected by the trajectory comprises determining a location at which a box collider associated with the selected holographic object collides with the real-world surface.

15. The method of claim 11, wherein detecting the user input setting the trajectory for the selected holographic object comprises detecting via the depth image data a user grab gesture interacting with the selected holographic object, and detecting via the depth image data a user release gesture releasing the selected holographic object.

16. The method of claim 15, wherein detecting via the depth image data the user grab gesture comprises fitting a skeletal model to the depth image data.

17. The method of claim 15, wherein determining the trajectory for the selected holographic object comprises determining based on one or more of a location of and/or a speed of a gesture motion between the user grab gesture and the user release gesture.

18. The method of claim 11, wherein detecting the user input setting the trajectory for the selected holographic object comprises receiving user input of one or more of a speech command, a gaze direction, a head direction, a button press, a pointing gesture, and/or a body gesture.

19. A head-mounted display device, comprising:
a see-through display system;
a depth image sensor;
a logic subsystem comprising one or more processors; and
memory storing instructions executable by the logic subsystem to
display, via the see-through display system, one or more holographic objects,
receive depth image data from the depth image sensor,
detect a user input setting a trajectory for a selected holographic object, in response to detecting the user input setting the trajectory for the selected holographic object, determine a trajectory for the selected holographic object set by the user input, determine, based upon the depth image data and the trajectory, a real-world surface intersected by the trajectory of the selected holographic object, determine a semantically understood classification for the real-world surface, when the real-world surface has a first semantically understood classification, display the selected holographic object as travelling along the trajectory and, upon encountering the real-world surface, changing in form from a smaller-form object to a first representation of a larger-form object, the larger-form object being an interactive holographic experience, and the smaller-form object being a representation of the interactive holographic experience in a closed state, and when the real-world surface has a second semantically understood classification different from the first semantically understood classification, then display the selected holographic object as traveling along the trajectory and upon encountering the real-world surface changing from the smaller-form object into a second representation of the larger-form object that is different than the first representation.

20. The head-mounted display device of claim 19, wherein the instructions are executable to display the selected holographic object as changing in form upon encountering the real-world surface based further upon metadata associated with the selected holographic object.

* * * * *